Nov. 16, 1965    C. VAN DER LELY ETAL    3,218,083
IMPLEMENTS FOR SPREADING POWDERED OR GRANULAR
MATERIALS OVER THE GROUND
Filed Dec. 13, 1962    5 Sheets-Sheet 1

INVENTORS
CORNELIS VAN DER LELY
ARY VAN DER LELY
BY
Mason, Mason & Albright
Attorneys

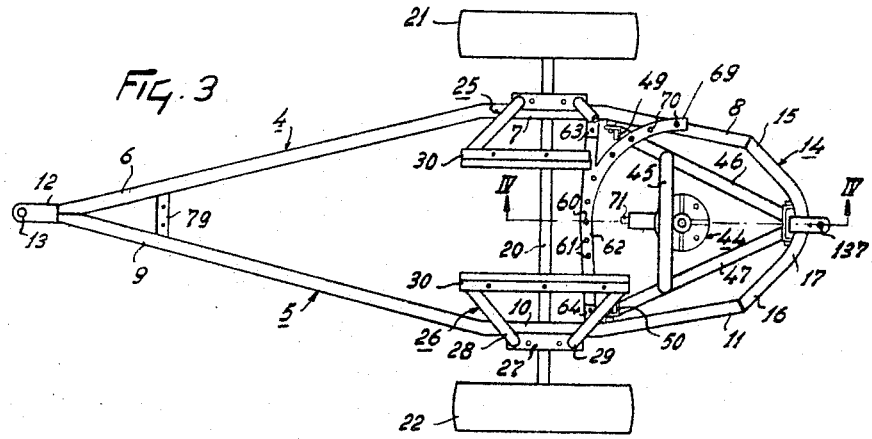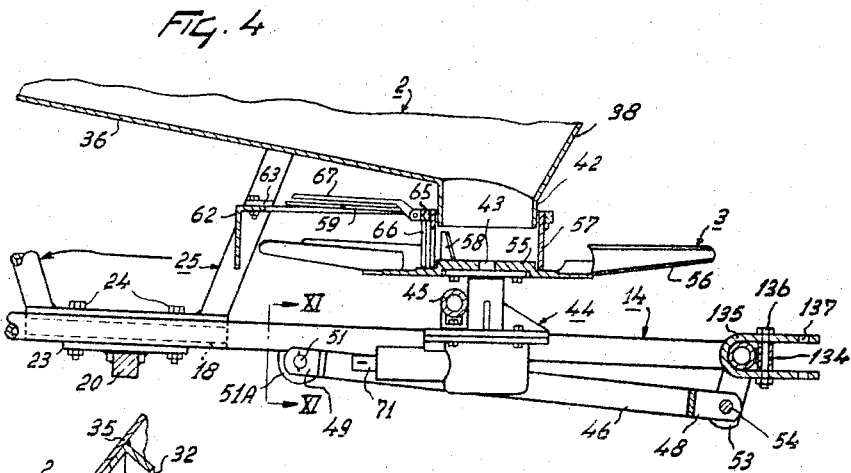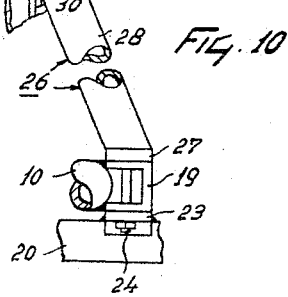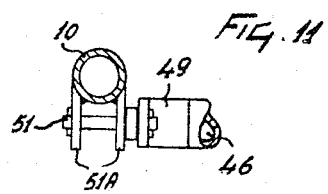

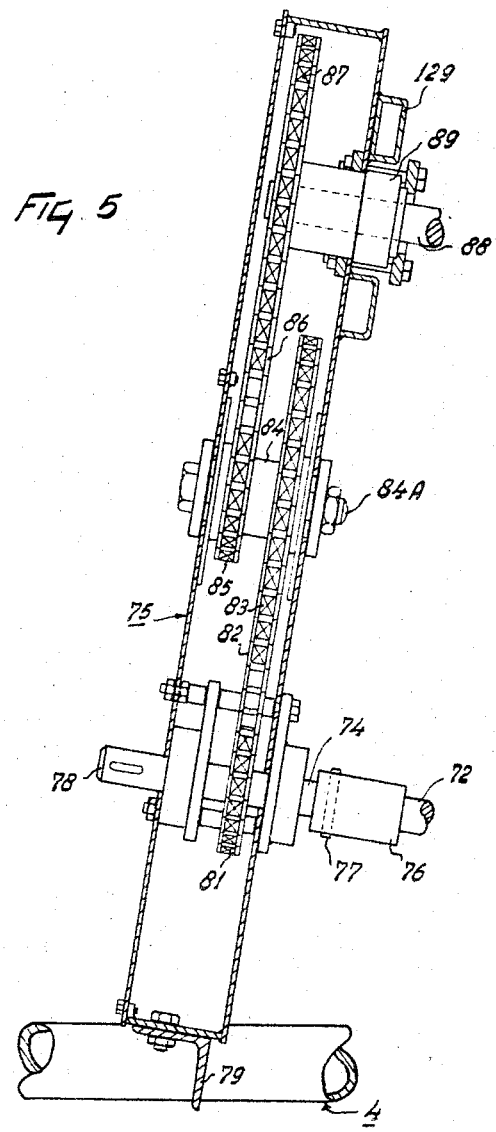

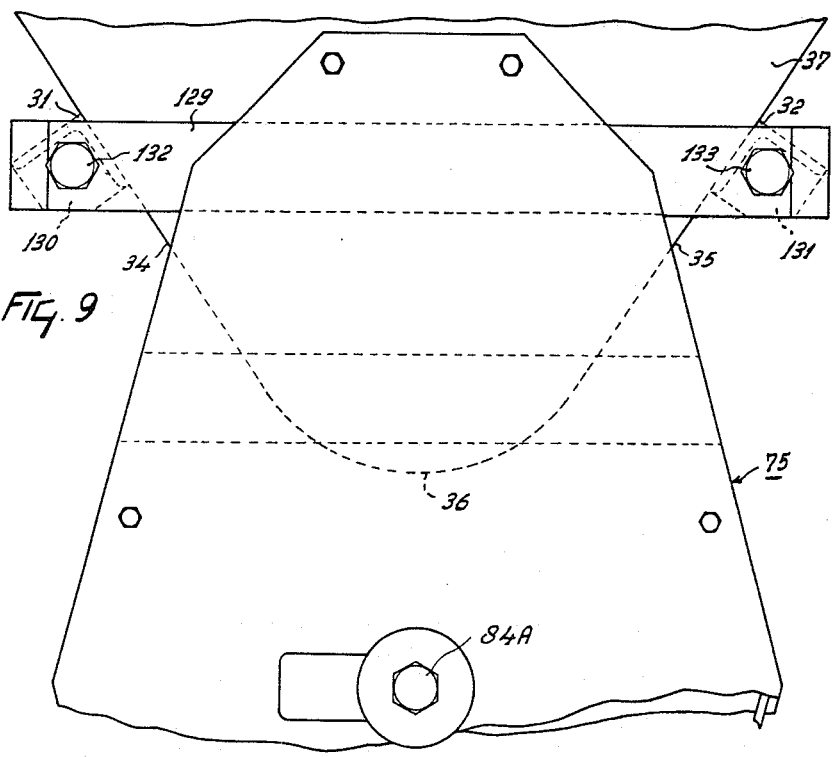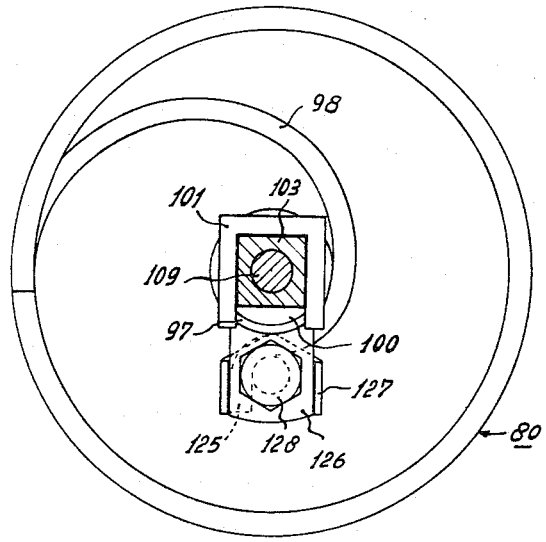

United States Patent Office 3,218,083
Patented Nov. 16, 1965

3,218,083
IMPLEMENTS FOR SPREADING POWDERED OR GRANULAR MATERIALS OVER THE GROUND
Cornelis van der Lely, Zug, Switzerland, and Ary van der Lely, Maasland, Netherlands, assignors to C. van der Lely N.V., Maasland, Netherlands, a Dutch limited-liability company
Filed Dec. 13, 1962, Ser. No. 244,313
Claims priority, application Netherlands, Dec. 20, 1961, 272,779
34 Claims. (Cl. 275—6)

This invention relates to implements for spreading powdered or granular materials over the ground, such implements being of the kind comprising a frame movable over the ground, a hopper adapted to contain material to be spread, a spreading member located adjacent an outlet of the hopper and a member disposed between the hopper outlet and the spreading member which member has at least one outlet port through which material from the hopper can reach the spreading member during use of the implement.

An object of the invention is the provision of a simple spreading implement whose various parts are readily accessible for cleaning and other purposes and whose hopper may have a relatively large capacity.

According to the invention, there is provided an implement of the kind set forth, wherein the spreading member is mounted on a supporting member which is connected to the frame so as to be movable relative thereto and so as to be capable of being retained in at least one fixed position relative to the frame, the construction and arrangement being such that the spreading member can be moved to a distance from the hopper outlet which allows the intervening member having the outlet port(s) to be removed from the implement.

For a better understanding of the invention, and to show how the same may be carried into effect, reference will now be made, by way of example, to the accompanying drawings, in which.

Figure 2:
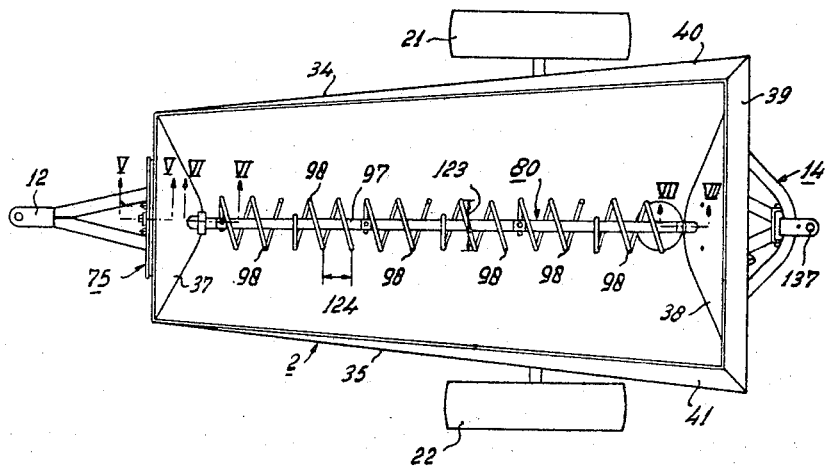
FIGURE 2 is a plan view corresponding to FIGURE 1.
Figure 1:
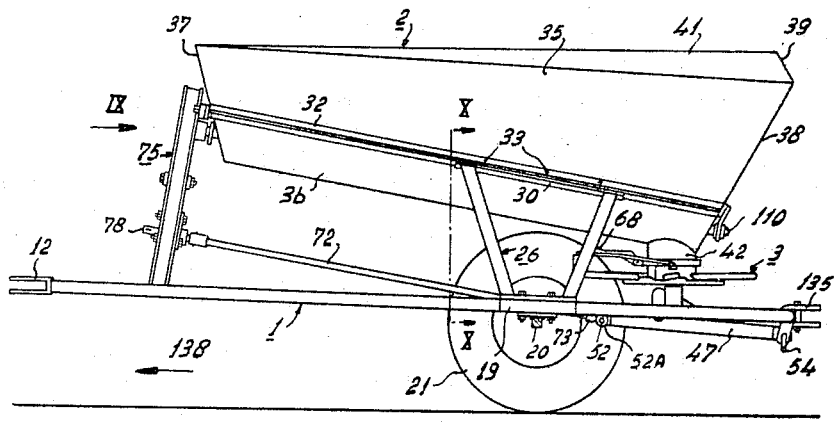
FIGURE 1 is a side elevation of an implement in accordance with the invention.
Figure 6:
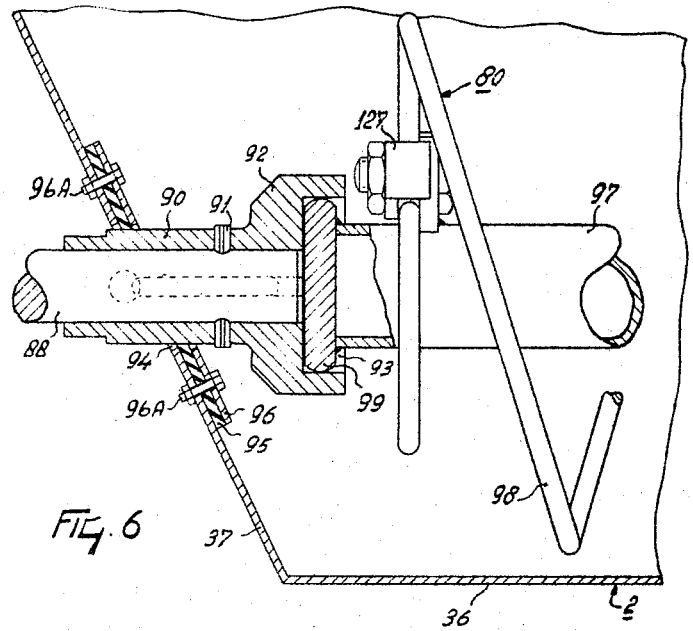
Figure 7:
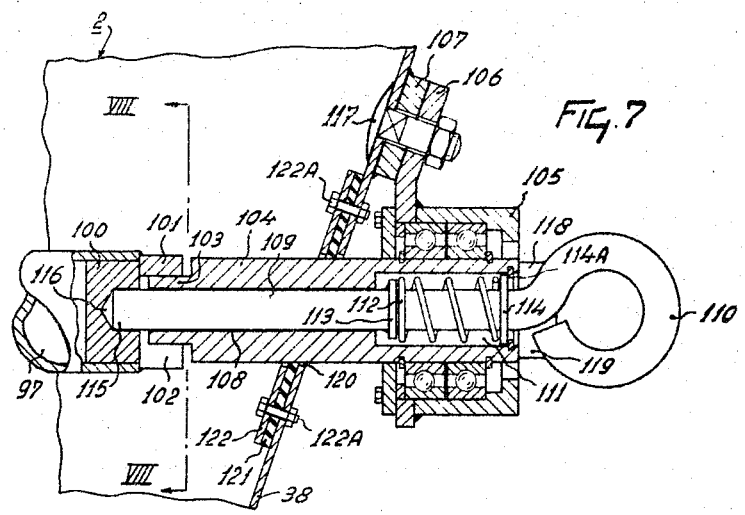

FIGURE 3 corresponds to FIGURE 2 but shows the implement with certain parts thereof removed, FIGURE 4 is a section, to an enlarged scale, taken on the line IV—IV of FIGURE 3, FIGURE 5 is a section, to an enlarged scale, taken on the line V—V of FIGURE 2, FIGURE 6 is a section, to an enlarged scale, taken on the line VI—VI of FIGURE 2, FIGURE 7 is a section, to an enlarged scale, taken on the line VII—VII of FIGURE 2, FIGURE 8 is a section taken on the line VIII—VIII of FIGURE 7, FIGURE 9 is a view, to an enlarged scale, as seen in the direction indicated by the arrow IX of FIGURE 1, FIGURE 10 is a section, to an enlarged scale, taken on the line X—X of FIGURE 1, and FIGURE 11 is a section, to an enlarged scale, taken on the line XI—XI of FIGURE 4.

Referring to the drawings, the implement has a frame which is generally indicated by the reference numeral 1 and upon which a hopper, generally indicated by the reference numeral 2, is mounted. The hopper 2 is adapted to contain a quantity of powdered or granular material, such, for example, as artificial fertiliser, which is to be spread over the ground. A spreading member generally indicated by the reference numeral 3 is located beneath the hopper 2 and towards the rear end thereof with respect to the intended direction of travel 138 (FIGURE 1) of the implement. The frame 1 includes two main frame beams 4 and 5 (FIGURE 3) which are of symmetrically identical construction. The beam 4 has three portions 6, 7 and 8 and the beam 5 three portions 9, 10 and 11. The portions 6 and 9 converge forwardly of the implement and the portions 8 and 11 converge rearwardly of the implement whereas the portions 7 and 10 extend parallel to one another. The leading ends of the portions 6 and 9 are secured to one another by a forked bracket 12 whose horizontally disposed limbs are formed with vertically aligned holes 13. The rearmost ends of the portions 8 and 11 are interconnected by a beam 14 which comprises two straight portions 15 and 16 integrally interconnected by a gently curved portion 17. As can be seen in FIGURE 3, the beam 14 has approximately the shape of a rounded V when seen in plan.

Relatively short beams 18 and 19 of channel-shaped cross-section are fastened to the two portions 7 and 10 of the beams 4 and 5 respectively (see FIGURES 1, 4 and 10), the non-rotatable axle 20 of two ground wheels 21 and 22 being connected to these beams. The axle 20 has two flat strips 23 welded or otherwise secured to it, these strips being fastened to the lowermost sides of the beams 18 and 19 respectively with the aid of bolts 24 (see FIGURES 4 and 10). Hopper supports 25 and 26 of symmetrically identical construction are also fastened to the beams 18 and 19 and, in view of the identical construction, only the support 26 will be described in detail. The support 26 comprises a horizontally disposed strip 27 which is fastened to the uppermost side of the beam 19 with the aid of the same bolts 24 as are used to secure one of the strips 23 to the lowermost side of that beam. Two beams 28 and 29 project upwardly in divergent relationship from opposite ends of the strip 27 and are interconnected at their uppermost ends by a strip 30 of L-shaped cross-section. The hopper 2 rests on the strips 30 of the supports 25 and 26 and, to this end, has strips 32 and 33 (see FIGURES 1, 9 and 10) fastened to its opposite sides with the aid of bolts 133. It will be apparent from FIGURE 10 of the drawings that, when the hopper 2 is in position on the implement, the limbs of the strips 30 fit between the limbs of the strips 31 and 32 respectively.

The hopper 2 has opposite side surfaces 34 and 35 whose lowermost edges are interconnected by an approximately cylindrically curved bottom 36 (see FIGURE 9). The leading edges of the surfaces 34 and 35 are interconnected by a front plate 37 and the rearmost edges are similarly interconnected by a rear plate 38. The width of the plate 37 is less than the width of the plate 38 so that, as will be evident from FIGURE 2, the hopper 2 decreases gently in width from its rear end to its front end. Moreover, as is evident from FIGURE 1, the bottom 36 of the hopper 2 slopes downwardly from the front to the rear thereof whereas the uppermost edge of the hopper is approximately horizontally disposed. The uppermost edge of the rear plate 38 is provided with a rim 39 which is bent over inwardly of the hopper. Similar rims 40 and 41 are provided along the uppermost edges of the side surfaces 34 and 35 respectively but these rims taper towards the front of the hopper in such a way that they merge with the respective side surfaces 34 and 35 at the points where the uppermost edges of these side surfaces meet the uppermost edge of the plate 37.

A hole is formed in the bottom 36 of the hopper 2 at the lowermost end thereof and a cylindrical outlet nozzle 42 projects downwardly from the said hole. The spreading member 3 (FIGURE 4) is arranged beneath the nozzle 42 and is mounted on the uppermost end of a substantially vertical shaft 43 that is journalled in a gear casing 44 fastened to a shallow arched beam 45. The beam 45 interconnects two straight beams 46 and 47 (FIGURES 3 and 4) that converge rearwardly of the implement. The leading ends of the two beams 46 and 47 are provided with approximately L-shaped brackets 49 and 50 respectively each of which brackets is turnably connected to the adjacent portion 7 or 10 of the beam 4 or 5 by means of a horizontal pivot pin 51 and a pair of lugs 51A or a horizontal pivot pin 52 and a pair of lugs 52A respectively (see FIGURES 1, 3, 4 and 11). The pivot pins 51 and 52 are coaxial and afford a horizontally disposed pivotal axis about which the beams 45, 46 and 47 can be turned, these beams affording a supporting member for the spreading member 3 and gear casing 44. The rearmost ends of the beams 46 and 47 are interconnected by a forked bracket 48 whose limbs are formed with horizontally aligned holes which can be brought into register with similar holes formed in two lugs 53 (FIGURE 4) which project downwardly and forwardly from the curved portion 17 of the beam 14. A horizontal locking pin 54 is provided for entry through the registering holes in the limbs of the bracket 48 and the holes in the lugs 53 to prevent the supporting member afforded by the beams 45, 46 and 47 from turning about the axis afforded by the pivot pins 51 and 52.

The gear casing 44 contains two meshing bevel gears (not visible in the drawings) one of which is fastened to the shaft 43 and the other of which is fastened to an input shaft 71 which is approximately horizontally disposed and whose leading splined or otherwise keyed end projects forwardly of the implement from the gear casing. The spreading member 3 itself comprises a central disc 55 which is bolted to a plate carried by the shaft 43 and six curved spreading arms 56 which are equally spaced around the circumference of the disc 55. As can be seen in FIGURE 4, the disc 55 is spaced below the outlet nozzle 42, an annulus 57 which surrounds the lowermost end of the said nozzle bearing against the disc 55 around a central raised portion of that disc which prevents substantially lateral movements of the annulus 57 relative thereto. The annulus 57 is provided with outlet ports 58 through which the powdered or granular material contained in the hopper 2 can reach the spreading member 3. The annulus 57 is prevented from turning with the disc 55 when the spreading member 3 is in use by means of an arm 59 which projects approximately radially from the annulus and whose free end is provided with a downwardly directed pin 60 (FIGURE 3) that can be entered in any one of a number of holes 61 formed in a strip 62 to fix the annulus 57 in a corresponding angular setting about the axis of rotation of the spreading member 3. The strip 62 is of L-shaped cross-section and has its opposite ends bolted to lugs 63 and 64 projecting from the beams 29 of the hopper supports 25 and 26 respectively. The strip 62 has a curved extension 69 which is formed with a number of further holes 70 into any one of which the pin 60 can be entered.

The annulus 57 is surrounded by a ring 65 which bears upon lugs projecting from the said annulus, the ring 65 carrying a number of masking plates 66 each of which is arranged to cooperate with a corresponding one of the outlet ports 58. An arm 67 projects approximately radially of the ring 65 and its free end is provided with a clamp 68 (FIGURE 1) which is not shown in detail but which can be employed to releasably secure the arm 67 to the strip 62 or to its extension 69 so that the masking plates 66 will occupy corresponding angular settings about the axis of rotation of the shaft 43. It will be apparent that, in dependence upon the relative angular settings of the outlet ports 58 and masking plates 66 about the said axis of rotation, the outlet ports 58 will be open to a greater or lesser extent.

The input shaft 71 of the gear casing 44 is connected to one end of a transmission shaft 72 by a universal joint 73 (FIGURE 1) of the "Hooke" type. The universal joint is arranged in a position which is such that the pivotal axis afforded by the pins 51 and 52 intersects the joint. The opposite end of the transmission shaft 72 is connected to a shaft 74 (FIGURE 5) which affords the output shaft of a transmission casing 75 (FIGURES 1 and 5). The connection between the shafts 72 and 74 is afforded by a sleeve 76 which is rigidly secured to the end of the shaft 72 and into the open end of which the shaft 74 is entered. A small transverse pin 77 is entered through matching holes formed in the shaft 74 and in the wall of the sleeve 76. The lowermost end of the transmission casing 75 is bolted to a beam 79 of L-shaped cross-section which beam, as can be seen in FIGURE 3, interconnects the portions 6 and 9 of the main frame beams 4 and 5 adjacent the forked bracket 12.

The transmission casing 75 contains transmission members that are arranged to drive an agitator which is generally indicated by the reference numeral 80 (FIGURE 2). The agitator 80 is disposed internally of the hopper 2 and extends between the plates 37 and 38 immediately above the bottom 36. The output shaft 74 of the transmission casing 75 has a splined or keyed end 78 which projects forwardly of the said casing and affords the input shaft thereof. The input and output shafts of the transmission casing 75 are thus integral, the input shaft afforded by the end 78 being intended to be connected to the power take-off shaft of a tractor or other propelling vehicle by means of an independent transmission shaft provided with suitable universal joints. The shaft 74 carries a sprocket 81 which is linked by an endless chain 82 to a further larger sprocket 83 mounted on a sleeve 84 which is turnable about a bolt 84A extending between the walls of the casing 75 approximately centrally thereof. A further smaller sprocket 85 is secured to the sleeve 84 alongside the sprocket 83 and is connected by an endless chain 86 to a further larger sprocket 87 fastened to the end of a shaft 88 which is journalled in a bearing 89 secured to one of the walls of the transmission casing 75 towards the upper end thereof. The shaft 88 extends between the transmission casing 75 and the inner side of the front plate 37 of the hopper 2. The end of the shaft 88 located within the hopper 2 has a coupling member 90 secured to it with the aid of a transverse pin 91 (see FIGURE 6). The coupling member 90 has a cup-shaped head 92 which is formed with a square recess 93 whose center coincides with the longitudinal axis of the shaft 88. The shaft 88 and the surrounding coupling member 90 are entered through a hole 94 formed in the front plate 37 of the hopper 2, the edges of the hole 94 being sealed by means of a rubber or other flexible washer 95 clamped to the inner side of the plate 37 with the aid of an annular plate 96 and a series of small bolts 96A.

The agitator 80 is comprised by a tube 97 (FIGURES 2 and 6 to 8) to which tube six helical springs 98 are fastened. The end of the tube 97 which faces the shaft 88 has a square plate 99 secured to it, this plate fitting within the square recess 93 of the head 92 in such a way that relative rotation between the tube 97 and the shaft 88 is prevented. The opposite end of the tube 97 which is disposed adjacent the rear plate 38 of the hopper 2 has a blind ring 100 secured internally thereof, the said ring 100 carrying a three-sided coupling member 101 (FIGURES 7 and 8) whose three sides define a recess 102 that is open in the direction of the fourth and missing side of the coupling member 101. A square projection 103 formed at one end of a hollow shaft 104 is entered in the recess 102 and is engaged by the sides of the coupling member 101 in such a way as to prevent relative rotation therebetween. The end of the shaft 104 remote from the square projection 103 is rotatably journalled in a ball bearing 105. The body of the ball bearing 105 incorporates an apertured lug 106 which is fastened by bolts 117 to a strip 107 which is itself secured to the rear plate 38 of the hopper 2 at the same level as the rearmost ends of the strips 31 and 32.

The hollow interior 108 of the shaft 104 accommodates a pin 109 which is provided at its rearmost end with a handle in the form of an eye 110. A portion of the shank of the pin 109 which adjoins the eye 110 is located within a recess 111 formed internally of the shaft 104 and of greater diameter than the coaxial hollow interior or bore 108. The recess 111 accommodates a helical spring 112 which is wound round the said portion of the shank of the pin 109 and which bears between a collar 113 fixed to the shank of the pin 109 and a washer 114 which surrounds the shank but is not secured thereto. As can be seen in FIGURE 7, the washer 114 itself bears against a resilient washer or the like 114A whose radially outermost edge is entered in a groove formed just inside the mouth of the recess 111. It will be apparent that the spring 111 acts to urge the tip 115 of the pin 109 into engagement with the blind bore 116 of the ring 100. The end of the hollow shaft 104 remote from the tube 97 has two diametrically opposed slots 118 and 119 cut in its cylindrically wall, these slots accommodating portions of the eye 110 when the pin 109 occupies the position shown in FIGURE 7. It will be apparent that this position is such that the eye 110 is located sufficiently clear of the ball bearing 105 to enable it to be readily accessible. The shaft 104 is entered through a hole 120 formed in the rear plate 38 of the hopper, this hole being sealed with the aid of members 121, 122 and 122A which are substantially identical to the members 95, 96 and 96A that have previously been described.

The six helical springs 98 which surround the tube 97 are made of spring steel and have only those ends thereof which are remote from the nozzle 42 secured to the said tube. Each spring 98 has a diameter 123 (FIGURE 2) which is approximately one-and-a-half times the pitch 124 of a single turn of the spring. Each spring has approximately two-and-a-half turns and the mounting thereof is such that the free end can move along the bottom 36 of the hopper 2 in a direction substantially parallel to the longitudinal axis of the tube 97. The end 125 (FIGURE 8) of each spring 98 which is remote from the nozzle 42 is clamped between a plate 126 fastened to the tube 97 and a further separate plate 127 by a bolt 128. Each of the springs 98 extends over approximately one-sixth of the length of the bottom 36 of the hopper 2 and each spring, with the exception of the rearmost one, has its free end located adjacent the fixed end of a neighbouring spring.

The rear side of the transmission casing 75 has a horizontal bar 129 (FIGURES 5 and 9) secured to it while the leading ends of the two strips 31 and 32 have transverse plates 130 and 131 respectively fastened to them. Registering holes are formed in the opposite ends of the bar 129 and in the plates 130 and 131 and bolts 132 and 133 respectively are entered through these holes to secure the front end of the hopper 2 to the transmission casing 75. The curved portion 17 of the beam 14 has a vertical sleeve 134 (FIGURE 4) secured to its rearmost side. A U-shaped bracket 135 is arranged around the beam 14 and is fixed in position by a bolt 136 entered through holes formed in its limbs and through the sleeve 134. The free ends of the limbs of the bracket 135 are formed with a pair of vertically aligned holes 137 through which a locking pin can be entered to connect the draw-bar of a cart or the like to the rear of the implement. The cart may, for example, be used to transport a bulk supply of powdered or granular material intended to be placed in the hopper 2.

In the use of the implement, the forked bracket 12 is connected to the tow-bar or the like of a tractor or other propelling vehicle while the input shaft 78 of the transmission casing 75 is connected by an independent transmission shaft to the power take-off shaft of the tractor or other vehicle. The implement can then be moved over the ground in the direction indicated by the arrow 138 in FIGURE 1 with the spreading member 3 rotating about the longitudinal axis of the shaft 43 and the agitator 80 rotating about the longitudinal axis of the tube 97. It will be apparent from FIGURE 5 that the speed of rotation of the shaft 88 and tube 97 is much less than the speed of rotation of the shaft 72. Upon bringing the annulus 57 and ring 65 to relative settings in which the outlet ports 58 are more or less open, powdered or granular material from the hopper 2 will be ejected from the spreading member 3 by virtue of the centrifugal force transmitted to it by rotation of the latter. The particular hole 61 or 70 which is chosen to cooperate with the pin 60 carried by the arm 59 will determine the angular settings of the outlet ports 58 about the axis of rotation of the spreading member 3 and thus the location of the strip of ground upon which the powdered or granular material will fall relative to the path of travel of the implement. In most cases, the arm 59 will be adjusted in such a way that the powdered or granular material will fall to the rear over a wide strip extending at both sides of the implement or over a strip extending substantially to one side of the implement. The quantity of material per unit time of operation or, assuming a constant speed of travel, the quantity of material per unit area of the land traversed, is controlled by adjusting the arm 67 relative to the arm 59 to bring the masking plates 66 carried by the ring 65 to appropriate settings relative to the outlet ports 58. The chosen setting is maintained by tightening the clamp 68.

The direction of rotation of the springs 98 and the pitch 124 thereof is such that the powdered or granular material contained in the hopper is urged gently towards the outlet nozzle 42, the material being loosened and/or broken up at the same time. Since the springs 98 are movable to a substantial extent in a direction parallel to the longitudinal axis of the tube 97, the said springs take up configurations which match the resistance to their movement which is offered by the material contained in the hopper 2. This arrangement prevents the springs from exerting an excessive compacting or dividing pressure upon the material. The variation in the pitch 124 of the springs 98 during use of the implement also varies the force which the springs exert on the material to move the material towards the outlet nozzle 42.

The agitator 80 can be removed readily from the hopper 2 by withdrawing the pin 109 against the action of the spring 112 and turning it through about 90° about its own longitudinal axis so that the eye 110 comes out of register with the slots 118 and 119. The pin 109 will then be automatically retained in a position in which its tip 115 is withdrawn from the blind hole 116 of the ring 100. As will be evident from FIGURES 7 and 8, the coupling member 101 can then be lifted off the projection 103 of the shaft 104 while the square plate 99, whose edges are rounded, can readily be withdrawn from the square interior 93 of the coupling member 90. The agitator 80 can then be lifted out of the hopper 2 which greatly facilitates the cleaning of both the agitator and the hopper. The use of the agitator 80 is undesirable with certain powdered and granular materials and, when such materials are to be spread, the agitator is left out of the hopper.

After use of the implement, the spreading member 3 and other adjacent parts can be cleaned readily by withdrawing the locking pin 54 from the lugs 53 and bracket 48 and turning the supporting member afforded by the parts 45, 46 and 47 downwardly about the pivotal axis afforded by the pins 51 and 52. This will bring the spreading member 3, the annulus 57, the ring 65 and the gear casing 44 to a readily accessible position in which they are well clear of the outlet nozzle 42 of the hopper 2. The ring 65 and annulus 57 merely rest upon the discs 55 of the spreading member 3 and can, accordingly, be lifted off that disc. The relatively large hopper 2 has a height which is approximately one-third of its length and a width which is approximately half its length, the capacity of the hopper being conveniently about 1,000 litres. During cleaning of the implement, the hopper 2 may remain upon the frame 1 or, if desired, it can be removed therefrom.

The height of the frame 1 above the ground may be changed by connecting the axle 20 to the said frame in a different manner. The strips 23 which, as can be seen in FIGURE 4, are fastened to the lowermost sides of the beams 18 and 19 can, instead, be inverted and placed on top of the strips 27 between the beams 28 and 29. Upon replacing the bolts 24, the axle 20 will be secured in a position in which it lies above the main frame beams 4 and 5 instead of below them. The frame 1 is thus displaced downwardly relative to the levels of the ground wheels 21 and 22 which is conductive, in the case of certain materials, to the efficient operation of the implement.

It will be apparent that the large size of the hopper 2 and the construction and arrangement of its supporting frame 1 provides an implement which is particularly suitable for spreading powdered or granular materials over relatively large areas since recharging of the hopper 2 with a fresh supply of material is required at much less frequent intervals than is necessary in the case of a conventional spreading implement. The construction and arrangement of the hopper supports 25 and 26 enables the hopper 2 to be mounted on, or removed from, the frame without difficulty when required.

What we claim is:

1. An implement for spreading powdered or granular materials over the ground comprising a frame movable over the ground, a hopper adapted to contain material to be spread, and including an outlet, a spreading member located adjacent said outlet of said hopper and a delivery member disposed between said hopper outlet and carried by said spreading member, said delivery member surrounding at least a part of the outlet of said hopper and having at least one outlet port through which material from the hopper can reach the spreading member during use of the implement, a supporting member connected to the frame, said spreading member being mounted on said supporting member, said supporting member being movable relative to the frame and capable of being retained in at least one fixed position relative to the frame whereby the spreading and delivery members can be moved to a distance from the hopper outlet which allows said delivery member having the outlet port to be removed from the implement.

2. An implement as claimed in claim 1, wherein said supporting member is turnably connected to said frame.

3. An implement as claimed in claim 1, wherein said supporting member includes means by which it can be retained in a fixed position relative to said frame which is such that said spreading member is correctly disposed relative to the outlet of the hopper for use of the implement.

4. An implement as claimed in claim 1, wherein at least part of a transmission for driving said spreading member is mounted on the supporting member.

5. An implement as claimed in claim 1, wherein said spreading member is disposed beneath the bottom of said hopper.

6. An implement as claimed in claim 5, wherein said delivery member bears upon said spreading member, said delivery member being provided with means to enable it to be fixed in any one of at least two different positions relative to the outlet of the hopper.

7. An implement as claimed in claim 1, wherein control means is provided adjacent the outlet of said hopper, said means being arranged to control the quantity of material per unit time which reaches said spreading member from said hopper during operating of the implement.

8. An implement as claimed in claim 7, wherein said control means bears on the delivery member.

9. An implement as claimed in claim 7, wherein said control means can be retained in any one of a number of different settings relative to said delivery member having the outlet port.

10. An implement as claimed in claim 1, wherein said supporting member is turnable about an axis relative to said frame, said axis being substantially horizontally disposed.

11. An implement as claimed in claim 1, wherein said spreading member is located beneath said hopper's outlet and is arranged so as to be movable downwardly out of an operational position by displacing said supporting member away from said hopper.

12. An implement as claimed in claim 1, wherein said hopper is of elongated construction and wherein the outlet thereof is afforded by a cylindrical nozzle disposed adjacent the rear end of said hopper considered in the intended direction of travel of the implement.

13. An implement as claimed in claim 12, wherein an agitator extends along the bottom of the hopper, said agitator including at least one helical portion of resilient construction which extends approximately parallel to the longitudinal direction of the bottom of the hopper.

14. An implement as claimed in claim 1, wherein said frame is formed principally from a plurality of substantially horizontally disposed beams and wherein hopper supports are releasably mounted upon said beams.

15. An implement as claimed in claim 14, wherein said hopper is provided with members cooperating with said hopper supports whereby said hopper is releasable therefrom.

16. An implement as claimed in claim 14, wherein said hopper supports are arranged towards the rear of the implement relative to the intended direction of travel thereof, and including a transmission casing containing a transmission by which an agitator for material contained in the hopper can be driven located in front of said hopper and being provided with means to support the front of said hopper.

17. An implement as claimed in claim 1, including two ground wheels, a non-rotatable axle mounting said ground wheels, wherein said frame of the implement is supported by said ground wheels, said non-rotatable axle arranged so that it can be secured to said frame in any one of at least two different positions which are such that the level of said frame above the ground in each of said positions is different.

18. An implement for spreading powdered or granular materials over the ground comprising a frame movable over the ground, a hopper with a rearwardly sloping bottom adapted to contain material to be spread, an outlet in the substantially lowermost portion of said bottom, said hopper and a spreading member located adjacent the outlet of said hopper, wherein said hopper contains an agitator which extends along the bottom of said hopper in a direction substantially parallel to the longitudinal axis of the said bottom, said agitator being adapted to ensure a uniform supply of material to said hopper's outlet during use of the implement and including at least one resilient portion which is movable in directions substantially parallel to the longitudinal axis of the bottom of said hopper, a supporting member hinged to the frame beneath said outlet, said spreader being mounted on said supporting member, said supporting member and said spreader being movable relative to the frame.

19. An implement as claimed in claim 18, wherein the agitator includes a plurality of helical portions which are arranged alongside one another, at least some of said helical portions being resiliently constructed and arranged so as to be capable of deflection independently of one another.

20. An implement as claimed in claim 19, wherein said agitator includes a helical spring arranged with its longitudinal axis substantially parallel to the longitudinal axis of the bottom of said hopper.

21. An implement as claimed in claim 20, wherein the end of said helical spring remote from said hopper's outlet is rigidly secured to a further part of said agitator, the opposite end of the said spring being free.

22. An implement as claimed in claim 20, wherein said agitator includes a plurality of helical springs.

23. An implement as claimed in claim 20, wherein said helical spring has from two to three complete turns.

24. An implement as claimed in claim 20, wherein the diameter of said helical spring is approximately one-and-a-half times the pitch thereof.

25. An implement as claimed in claim 20, wherein one end of each said helical spring is disposed adjacent an end of a neighboring helical spring.

26. An implement as claimed in claim 20, wherein said helical spring extends over approximately one-sixth of the length of the bottom of the hopper.

27. An implement as claimed in claim 20, wherein the agitator includes a tube to which said helical spring is attached, the arrangement being such that the longitudinal axis of said tube approximately coincides with the longitudinal axis of said helical spring.

28. An implement as claimed in claim 27, wherein said agitator is mounted in said hopper with means readily releasable therefrom.

29. An implement as claimed in claim 28, including a coupling member and a driving shaft carrying same, wherein one end of said tube is provided with a non-circular member which is adapted to be entered in a correspondingly shaped recess of said coupling member, the said driving shaft occupying a fixed position relative to said frame.

30. An implement as claimed in claim 29, including a pin movably mounted on said hopper wherein the opposite end of said tube includes a member formed with a hole adapted to cooperate with said pin.

31. An implement as claimed in claim 30, including a bearing and a member supported thereby with which the end of said tube can be engaged, wherein said pin is arranged in said bearing.

32. An implement as claimed in claim 30, wherein said pin is spring-loaded in such a way that the tip thereof is urged into the aforesaid hole formed in said member carried by said tube.

33. An implement as claimed in claim 18, wherein a transmission is arranged in front of said hopper relative to the intended direction of travel of the implement, the transmission being arranged to drive both said spreading member and said agitator.

34. An implement for spreading powdered or granular materials over the ground, comprising a frame movable over the ground, a hopper adapted to contain material to be spread, an outlet in said hopper at the rear thereof, with respect to the direction of travel of the implement, said hopper containing an agitator including a helical spring arranged with its longitudinal axis substantially parallel to the bottom of said hopper, said longitudinal axis extending in the traveling direction of the implement, the forward end of said helical spring being rigidly secured to an axle driving the agitator, the rear end of the helical spring being free, control means being provided adjacent the outlet of said hopper, said control means being arranged to control the quantity of material per unit time which reaches said spreading member from said hopper during operation of said implement, said agitator including a tube to which said helical spring is attached, one end of said tube being provided with a non-circular member which is adapted to be entered in a corresponding shaped recess of a coupling member fixed to a driving shaft, a pin supported at one end of said hopper, the opposite end of said tube including a member formed with a hole adapted to cooperate with said pin.

References Cited by the Examiner

UNITED STATES PATENTS

| | | | |
|---|---|---|---|
| 802,230 | 10/1905 | Moss | 275—2 |
| 1,166,476 | 1/1916 | Parrish | 275—15 |
| 1,312,226 | 8/1919 | Bangert | 275—15 |
| 2,296,909 | 9/1942 | Dake | 275—2 |
| 2,340,810 | 2/1944 | Hoffstetter | 275—8 |
| 2,555,934 | 6/1951 | Richey et al. | 275—8 |
| 2,804,998 | 9/1957 | Kirschmann | 275—2 |
| 3,013,803 | 12/1961 | Piester | 275—8 |

ABRAHAM G. STONE, *Primary Examiner.*

WILLIAM A. SMITH III, *Examiner.*